United States Patent [19]

Wells et al.

[11] Patent Number: 5,314,064

[45] Date of Patent: May 24, 1994

[54] SHEET METAL CLIP

[75] Inventors: Thomas J. Wells, Carthage, Mo.; John D. Poffenberger, Cincinnati, Ohio

[73] Assignee: L&P Property Management Company, Chicago, Ill.

[21] Appl. No.: 56,195

[22] Filed: May 3, 1993

[51] Int. Cl.$^5$ .............................................. B65D 71/00
[52] U.S. Cl. ..................................... 206/340; 206/820
[58] Field of Search ............................. 206/338–348, 206/820

[56] References Cited

U.S. PATENT DOCUMENTS

| | | | |
|---|---|---|---|
| 3,613,878 | 10/1971 | Langas et al. ...................... | 206/340 |
| 3,722,669 | 3/1973 | Meier et al. ........................ | 206/340 |
| 3,722,670 | 3/1973 | Plunkett . | |
| 4,508,220 | 4/1985 | Pearson . | |

FOREIGN PATENT DOCUMENTS 2023216  12/1979  United Kingdom ................ 206/348

*Primary Examiner*—Jimmy G. Foster
*Attorney, Agent, or Firm*—Wood, Herron & Evans

[57] ABSTRACT

An improved sheet metal clip is interconnected in a collated stack of clips with a plastic rope inserted within slots on each side edge of each clip. Each clip is generally U-shaped having a crown portion with a pair of parallel spaced leg portions depending from the crown portion. The rope is inserted within slots formed in the side edges of each clip. The preferred embodiments of the improved clip include slots which are obliquely angled relative to the side edge of the clip, slots which are in a keyhole configuration having a narrowed throat portion and an enlarged opening, and slots which are both obliquely angled and in the keyhole configuration. The rope can be retained within the slots by deflecting a tab section of the crown portion to enclose the rope within the slot or by sizing the rope to be larger in diameter than the width of the narrowed throat portion of the keyhole slot and to be retained within the enlarged circular opening portion of the keyhole slot. Additional methods to retain the rope within the slots include applying a hot melt adhesive deposit within each slot after the rope has been inserted therein or to heat a thermally activated portion of the plastic rope after it has been inserted within the slot to thereby engage the slot and retain the rope therein. The collated stack of clips interconnected with the plastic rope of the present invention provides the needed flexibility and tensile strength for use in manufacturing applications and does not detrimentally affect the operation of the clip in clamping wires and springs together.

18 Claims, 1 Drawing Sheet

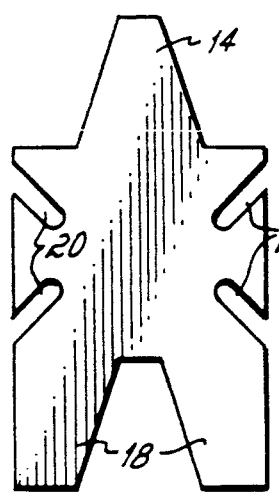
FIG.1
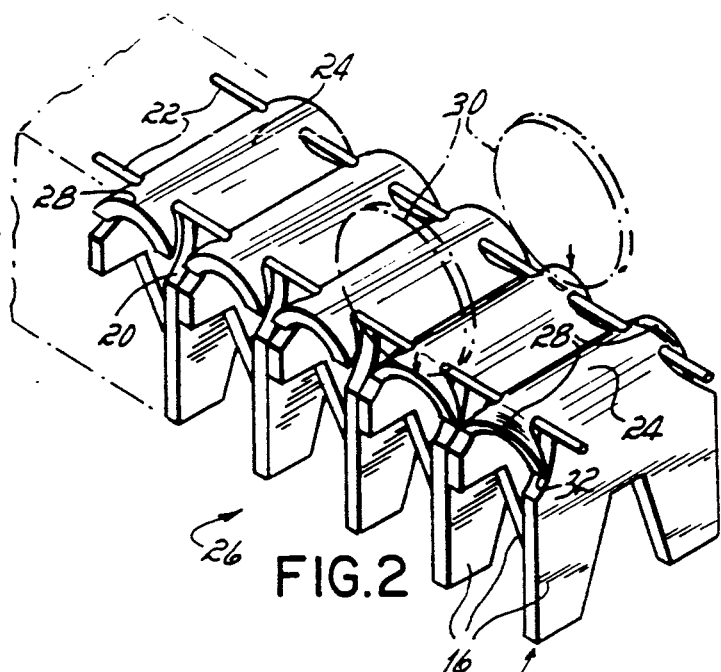
FIG.2
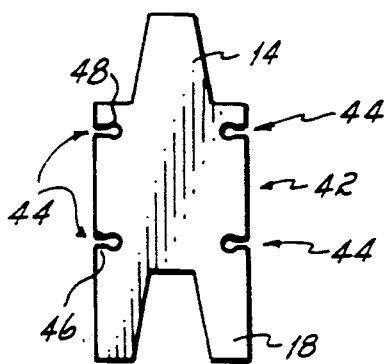
FIG.3
FIG.4
FIG.5
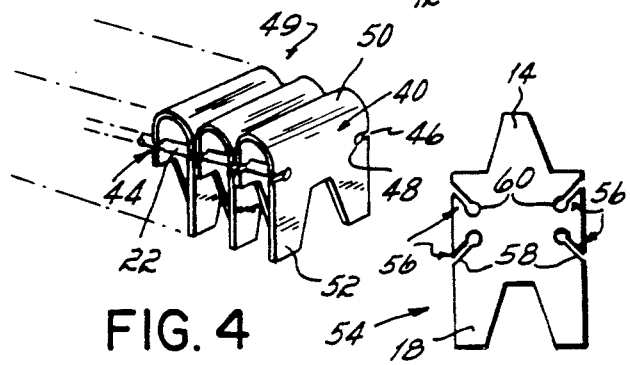
FIG.6
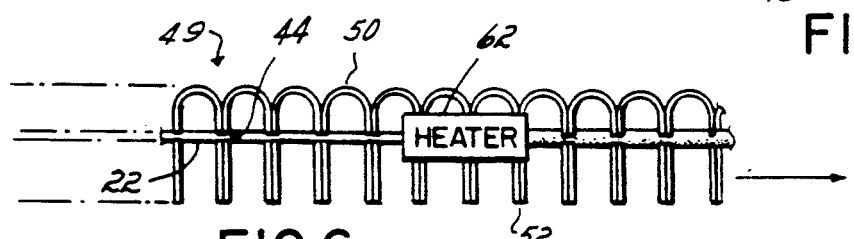
FIG.7
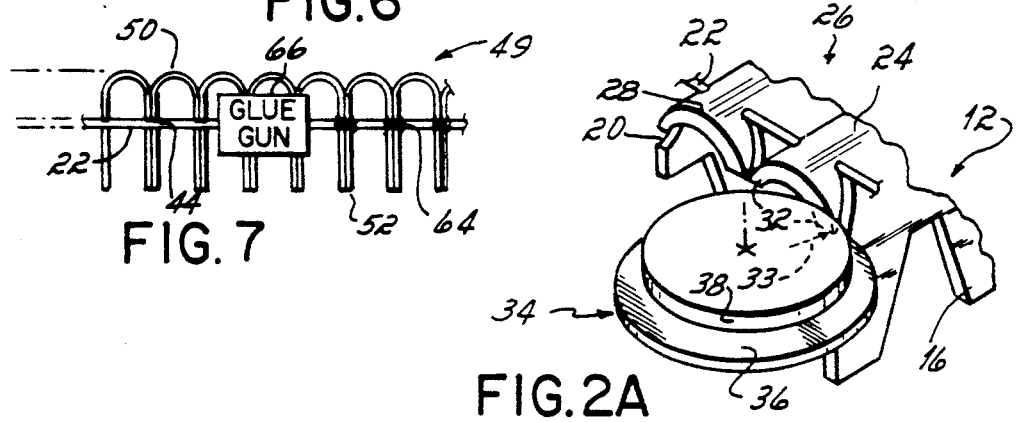
FIG.2A

SHEET METAL CLIP

BACKGROUND OF THE INVENTION

This invention relates to an improved sheet metal clip. More particularly, it relates to an improved stack of sheet metal clips in which the clips are collated or interconnected for storage or for use in a clinching tool.

It is well known in the mattress and bedding industries to join wire and spring elements together with a sheet metal clip. A typical clip for use in such applications is generally U-shaped having an arcuate crown portion and oppositely spaced leg portions depending from the crown portion. Such a U-shaped clip is clamped onto wires or bedsprings by a clinching tool. A typical clinching tool for use with U-shaped clips includes a generally J-shaped jaw into which the leading clip in a stack of clips is indexed. The clinching tool has a blade which upon actuation thrusts downwardly to shear off the leading clip from the stack of clips and thereby clamp the leading clip around a pair of wires positioned within the J-shaped jaw. A typical clinching tool of the type described is illustrated in U.S. Pat. No. 2,574,811.

The sheet metal clips are collated and aligned in a stack configuration such that each clip is similarly oriented and in abutting relationship with the adjacent clip. The clips are maintained in the stacked configuration for both storage and for use with the clinching tool. For storage, the stack of clips is typically wound under tension upon a cylindrical core member to provide a compact spool of interconnected clips. For use, the stack of clips is unwound under tension beginning with the free end of the stack, which is inserted into the clinching tool for use in clamping a plurality of wires together.

The clips must be interconnected in the stacked configuration so that they are sufficiently flexible to be wound onto a spool and also be interconnected with sufficient strength to withstand the high tensile forces associated with the winding and unwinding of the stack of clips upon the spool. However, the method of joining the clips in a stack configuration, while possessing the requisite strength and flexibility, cannot interfere with the operation of existing clinching tools. Likewise, the structure used to interconnect the sheet metal clips in a stack configuration must not detrimentally affect the ultimate clamping of the clip on a plurality of wires.

One prior solution for interconnecting clips in such a manner is disclosed in U.S. Pat. No. 3,722,670 in which a clip assembly utilizes an elongated strand of plastic filament along each lateral edge of the stack. The plastic filament is inserted into pre-formed notches on each side edge of each clip of the stack. However, the plastic filament is held in the notches only by frictional forces. Therefore, any pulling force or tension applied to the stack of clips such as the forces applied while winding or unwinding the clip stack or indexing the clip stack into a clinching tool, would act to dislodge the filament from the notches of individual clips and thereby misalign or separate those clips from the clip assembly. The plastic filament interconnection as disclosed in U.S. Pat. No. 3,722,670, being merely frictionally engaged within the side notches of each clip, does not sufficiently interconnect the clips for use in an industrial application.

Another prior solution to the above-described problem is disclosed in U.S. Pat. No. 4,508,220 in which the individual U-shaped clips of a clip stack are interconnected by a small diameter flexible metal wire which is welded or otherwise secured to the crown portion of the clips by a metal to metal bond. While such an interconnection may provide the adequate strength and flexibility required of a stack of clips, a problem with the arrangement as disclosed in this patent is that when the leading clip is severed from the remainder of the stack, the severed interconnecting wire welded to the crown portion of each clip presents a sharp, abrasive edge which is a source of injury to workers and which may cut or tear the fabric placed over an innerspring mattress constructed using such a clip.

As evidenced by the above background, there still exists a need for an improved sheet metal clip and a method for interconnecting such clips to form a stack which overcomes these identified shortcomings while still providing a strong and flexible interconnection which does not inhibit the effective clamping of wires as applied with a clinching tool.

SUMMARY OF THE INVENTION

It has been an objective of the present invention to provide an improved sheet metal clip which is interconnected with the requisite flexibility and tensile strength in a stacked configuration for use in the mattress and bedding industry.

An additional objective has been to provide a stack of sheet metal clips which can be used with current clinching tools common in the mattress and bedding manufacturing industry.

A further objective of the invention has been to provide a stack of sheet metal clips which yields no sharp edges when a clip is severed from the stack.

A further objective of the present invention has been to provide a sheet metal clip which yields a secure and quiet or non-squeaking clamp when joining wires in a mattress or box-spring assembly.

These objective are attained by an improved generally U-shaped sheet metal clip. The clip has an arcuate crown portion and spaced generally parallel leg portions depending from the crown portion. The clip has spaced side edges into which slots are cut.

In a first embodiment of the improved sheet metal clip the slots cut into the side edges of the clip are obliquely angled relative to the side edge of the clip. Each slot originates at the side edge of the clip and is angled toward the crown portion of the clip. In another preferred embodiment, the obliquely angled slots are of a keyhole configuration. The keyhole slot has a throat portion with a pair of generally parallel side walls and the slot terminates in an enlarged generally circular opening.

A third preferred embodiment of the invention of the improved U-shaped metal clip includes a keyhole slot configuration which is generally perpendicular relative to the side edge instead of being obliquely angled relative to the side edge of each clip.

The improved U-shaped metal clips are aligned in a stacked configuration to be similarly oriented having their crown portions generally parallel to one another with an outside face of the leg portion of each clip abutting an outside face of a leg portion of an adjacent clip.

The clips are held in this collated stack configuration by plastic rope inserted within the slots on each side edge of the clips. The plastic rope interconnects the collated stack of sheet metal clips with the flexibility and tensile strength required for winding and unwinding vast quantities of collated stacked clips onto and off of a spool and for use with existing clinching tools.

The plastic rope is retained by the enlarged opening in the keyhole slot of those clips of the present invention having such a slot configuration. The embodiment of the improved sheet metal clip of the present invention having the obliquely angled slot without the keyhole configuration has a tab section of the crown portion which extends on each lateral end of the crown portion and is deflected or crimped either inwardly or downwardly thereby retaining the rope within the slot.

Furthermore, during the manufacture of the collated stack of clips, an adhesive deposit can be applied after the rope has been inserted within the slot which will maintain the plastic rope within the slots. Lastly, the plastic rope may include a thermally activated component which upon heating, after being inserted within the slots of the collated stack of clips, either expands to fill any voids between the rope and the slot or acts as an adhesive which upon cooling will retain the rope within the slots.

When the collated stack of clips of the present invention is used with a clinching tool to clamp wires or innersprings within mattresses or the like, the leading clip of the stack will be severed from the stack and the portion of the plastic rope joining the leading clip to the stack will be cut. However, since the rope is plastic, and not metal, which interconnects the clips of the present invention, no sharp edges will be created on the severed rope portions when the leading clip is cut from the stack.

Additionally, the section of the plastic rope which is severed along with the leading clip of each stack will be clamped within the arcuate crown portion of the clip around the wires or springs of the mattress. In that the rope is plastic, as opposed to metal, the portion clamped with the wires will enhance the effectiveness of the clip by acting as a buffer or sound absorbing material to prevent squeaks, as opposed to being a source of them within the clamped wires.

BRIEF DESCRIPTION OF THE DRAWINGS

The objectives and features of the invention will become more readily apparent from the following detailed description taken in conjunction with the accompanying drawings in which:

FIG. 1 is a plan view of a blank used to form a first preferred embodiment of the clip of the present invention;

FIG. 2 is a perspective view of a portion of a collated stack of clips formed from the clip blank of FIG. 1 in which a tab on the crown portion of each clip is deflected downwardly to retain the plastic rope within a slot of each clip;

FIG. 2A is a view similar to FIG. 2 with the tab section of the crown being deflected inwardly to retain the plastic rope;

FIG. 3 is a plan view of a blank used to form a second preferred embodiment of the clip of the present invention;

FIG. 4 is a partial perspective view of a collated stack of clips formed from the blank of FIG. 3;

FIG. 5 is a plan view of a blank used to form a third preferred embodiment of the clip of the present invention;

FIG. 6 is a schematic representation of a heater thermally activating the rope interconnecting the clips; and FIG. 7 is a schematic representation of a glue gun applying an adhesive deposit to the slots to retain the rope therein.

DETAILED DESCRIPTION OF THE INVENTION

A sheet metal blank 10 used to form a first preferred embodiment of a clip 12 according to the present invention is shown in FIG. 1. The blank 10 is generally planar and is bent along a lateral mid-section plane to form the generally U-shaped clip configuration shown in FIG. 2. The blank 10 has a single prong 14 leg portion 16 which when clamped around a plurality of wires (not shown) fits between dual prongs 18 of an opposed leg portion 16 of the clip. A pair of slots 20 is formed on each side edge of the clip 12 which are obliquely angled relative to the side edge.

The clip blank 10 is bent to form the U-shaped clip 12 of which a number of U-shaped clips 12 are shown interconnected by a pair of plastic ropes 22 inserted within the slots 20 of each clip 12 as shown in FIG. 2. Each clip 12 has an arcuate crown portion 24 from which each leg portion 16 depends downwardly. The slots 20 of the first embodiment of the clip 12 of the present invention are angled to extend from the side edge of the clip upwardly and inwardly toward the crown portion 24 of the clip 12.

As shown in FIG. 2, the clips 12 of a collated stack 26 are similarly oriented and aligned having their crown portions 24 generally parallel with one another and the leg portion 16 of each clip 12 abutting and lying in face to face contact with the leg portion 16 of an adjacent clip 12. With the clips 12 juxtapositioned in such a manner, the obliquely angled slots 20 are aligned to permit the rope 22 to be inserted therein and extend the length of the collated stack 26 of clips 12.

The rope 22 of the present invention used to interconnect the clips 12 into the collated stack 26 is fabricated from a plastic material, preferably a low density polyethylene or polyester plastic. Such a rope 22 provides flexibility in the collated stack 26 of clips 12 which is required when bending and winding the stack 26 onto a spool (not shown). Additionally, the plastic rope 22 offers the required tensile strength to withstand the pulling and twisting forces experienced by the stack 26 of clips 12 without breaking. Lastly, when the clip 12 is severed from the stack of clips, the plastic rope 22 does not produce a sharp or jagged barb which is potentially injurious to workers and can tear the fabric covering the mattress into which the clip 12 is incorporated.

As shown in FIG. 2, a tab section 28 on each lateral end of the crown portion 24 of the clip 12 is created in part by the configuration of the oblique slots 20 extending from the side edge of each clip 12. After the rope 22 has been inserted within the slots 20 of the stack 26 of clips 12, the tab sections 28 are deflected or crimped downwardly as by rollers 30 or other suitable mechanisms so that each point 32 on the tab section 28 contacts a sidewall of the slot 20 thereby enclosing the plastic rope within the slot. The plastic rope is thusly prevented from dislodging out of the slot and thereby rupturing the collated stack 26 of clips.

An alternative method for retaining the plastic rope 22 within the obliquely angled slot 20 of the first preferred embodiment of the clip 12 is shown in FIG. 2A in which rollers 34, or other suitable mechanisms, have been rotated approximately 90° from the position shown in FIG. 2 so that the points 32 of each tab section 28 will be deflected or crimped inwardly toward the longitudinal axis of the collated stack 26 of clips. A benefit of deflecting the points 32 inwardly as in FIG. 2A, as opposed to downwardly as in FIG. 2, is that the crown portion 24 of each clip 12 is not deformed and that the profile of the clip 12 is maintained in a generally U-shape so that when applied to a pair of wires for clamping the crown portion 24 is more securely seated over the wires (not shown). The rollers 34 of FIG. 2A include a rim or annular flange 36 which steadies the tab section 28 to inhibit any downward deflection while a shoulder 38 contacts and crimps the tab section points 32 as shown by arrow 33.

A second preferred embodiment of a clip 40 of the present invention is formed from a clip blank 42 shown in FIG. 3. Keyhole shaped slots 44 project generally orthogonally from the side edges of the clip 40. Each keyhole slot 44 includes a throat section 46 which terminates at an enlarged generally circular opening 48 thereby forming the keyhole configuration of the slot 44.

Referring to FIG. 4, the clip blank 42 of the second preferred embodiment of the clip 40 of the present invention is bent to a generally U-shaped configuration and collated in a stack 49 comparable to the stack 26 shown in FIG. 2. The second preferred embodiment of the clip 40 has a generally arcuate crown portion 50 from which spaced generally parallel leg portions 52 depend downwardly. Each clip 40 has a dual prong 18 and a single prong 14 leg portion. The single prong 14 interlocks between the dual prongs 18 when the clip is clamped on the wires.

When the clips 40 are collated in a stacked configuration, the crown portions 50 are generally parallel with respect to one another and the leg portions 52 abut in face to face contact with the leg portion 52 of an adjacent similarly oriented clip 40.

The plastic rope 22 is inserted within the keyhole slots 44 until it is contained within the generally circular opening 48 of the keyhole slot 44. The diameter of the plastic rope 22, once again preferably fabricated from polyethylene or polyester plastic, is preferably about 0.67 inches in diameter. Likewise, the enlarged opening 48 of each keyhole slot 44 is preferably about 0.67 inches in diameter; however, the throat portion 46 of each keyhole slot 44 is preferably smaller, on the order of about 0.060 inches wide. These dimensional relationships between the diameter of the plastic rope 22, the diameter of the enlarged opening 48, and the width of the throat portion 46 require that the rope 22 be forcefully inserted within the keyhole slot 44 to temporarily flatten or deform for passage through the narrowed throat portion 46 until the rope 22 is lodged within the enlarged opening of the keyhole slot 44. Once contained within the enlarged opening, the rope will be retained within the keyhole slot due to its larger diameter relative to the narrowed width throat portion 46 of the keyhole slot 44.

A third preferred embodiment of an improved sheet metal clip of the present invention can be formed from a blank 54 shown in FIG. 5. The third embodiment of the clip incorporates the keyhole slot geometry of the second embodiment with the obliquely angled slot configuration of the first preferred embodiment. As shown in FIG. 5, the third embodiment of the clip is formed from the blank 54 having obliquely angled keyhole slots 56 relative to side edges of the clip. Each keyhole slot 56 has a narrowed throat portion 58 and an enlarged generally circular opening 60. When formed into the U-shaped configuration, the third embodiment of the clip has the generally arcuate crown portion 24 and the pair of parallel spaced leg portions 16 depending from the crown portion 24. The leg portions 16 include a single prong 14 and a dual prong 18 leg portion. The plastic rope 22 for use with the third preferred embodiment of the present invention is once again sized to be approximately 0.067 inches in diameter with the keyhole throat portion 58 of the clip being approximately 0.60 inches wide, and the enlarged opening 60 being about 0.067 inches in diameter. The plastic rope 22 is thereby contained within the keyhole slot enlarged opening 60 as previously described in reference to the second preferred embodiment of the present invention.

FIGS. 6 and 7 each shows schematic representations of additional methods according to the present invention for retaining the plastic rope 22 within the slots of the preferred embodiments of the clips. In FIG. 6 a heater 62 activates a thermally activated portion (not shown) of the plastic rope 22 so as to enlarge the diameter of the rope 22 after insertion into the clip slots. The plastic rope 22 for use with the heater 62 is preferably manufactured having a polyester plastic core (not shown) with a low melt sleeve material, for example, polyethylene. When the rope 22 having this composition is heated as shown in FIG. 6, the polyethylene sleeve portion is thermally activated, softens and increases in diameter to adhere to the clip slots. When cooled, the thermally activated component of the plastic rope 22 hardens while in contact with the slot and is thereby retained within the slot.

FIG. 7 represents a method of inserting an adhesive deposit 64 within each slot after the plastic rope 22 has been inserted therein. A glue gun apparatus 66 dispenses the hot melt adhesive deposit 64 in each slot as the clip stack passes by the glue gun 66. A solenoid operated glue gun capable of placing small droplets of glue at the rate of several hundred a minute is manufactured by Nordson Corporation and is suitable when appropriately configured to apply hot melt glue within the slots of the clips of the present invention.

It will be appreciated by one of skill in the art that clips of other shapes and geometries with slots in other positions than those identified herein could be used to form the collated stack of clips joined by ropes according to the present invention.

From the above disclosure of the general principles of the present invention and the preceding detailed description of the preferred embodiments, those skilled in the art will readily comprehend the various modifications to which the present invention is susceptible. Therefore, we desire to be limited only by the scope of the following claims:

We claim:

1. A collated stack of sheet metal clips comprising:
   a plurality of similarly oriented generally U-shaped clips, each said clip having an arcuate crown portion and spaced parallel leg portions depending from said crown portion, each said clip being juxtapositioned to a leg portion of an adjacent clip, each said clip having opposed lateral side edges;
   a slot extending inwardly from each said side edge of each said leg portion, each said slot being obliquely angled with respect to said side edge; and
   a plastic rope positioned within said slots and extending the length of the stack of clips.

2. The stack of clips of claim 1 further comprising:

means for retaining said rope within said slots.

3. The stack of clips of claim 2 wherein said retaining means comprises an enlarged opening formed at a terminal end of each said oblique slot, said rope being contained within said enlarged opening.

4. The stack of clips of claim 2 wherein said retaining means comprises a tab section extending from each lateral end of said crown portion of each said clip, each said tab section being defined in part by said oblique slots in said spaced leg portions, said tab section being deflected after insertion of said ropes into said slots so as to retain said ropes within said slots.

5. The stack of clips of claim 4 wherein said tab section is deflected inwardly toward a longitudinal axis of the collated stack of sheet metal clips.

6. The stack of clips of claim 4 wherein said tab section is deflected downwardly toward said leg portion of each said clip.

7. The stack of clips of claim 2 wherein said retaining means comprises an adhesive deposit inserted into said slots after insertion of said ropes therein.

8. The stack of clips of claim 2 wherein said retaining means comprises a thermally activated portion of said rope whereby said rope is inserted within said slots and then thermally activated so as to retain said rope therein.

9. A collated stack of sheet metal clips comprising:
a plurality of similarly oriented generally U-shaped clips, each said clip having an arcuate crown portion and spaced parallel leg portions depending from said crown portion, each said clip being juxtapositioned to a leg portion of an adjacent clip, each said clip having opposed side edges;
a slot in each said side edge of each said clip;
a plastic rope positioned in said slots, said rope extending the length of the stack of clips; and
an adhesive deposit inserted within each said slot after insertion of said rope therein.

10. A collated stack of sheet metal clips comprising:
a plurality of similarly oriented generally U-shaped clips, each said clip having an arcuate crown portion and spaced parallel leg portions depending from said crown portion, each said clip being juxtapositioned to a leg portion of an adjacent clip, each said clip having opposed side edges;
a slot in each said side edge of each said clip; and
a plastic rope positioned in said slots, said rope extending the length of the stack of clips, said rope including a thermally activated portion whereby said rope is thermally activated after insertion into said slots so as to retain said rope within said slots.

11. A method of manufacturing a collated stack of sheet metal clips comprising the steps of:
forming a planar sheet metal blank into a generally U-shaped clip having an arcuate crown portion and spaced parallel leg portions depending from said crown portion, said clip having opposed side edges,
forming a slot in each side of said blank which extends inwardly from each said side edge and is obliquely angled with respect to said side edge;
aligning a plurality of said similarly oriented U-shaped clips such that each said clip is juxtapositioned to a leg portion of an adjacent said clip; and
inserting a plastic rope within said slots on each said side edge of said clips.

12. The method of claim 11 further comprising:
deflecting a tab section extending from each lateral end of said crown portion of each said clip, each said tab section being defined in part by said oblique slots in said spaced leg portions, said tab section being deflected after insertion of said rope into said slots so as to retain said rope within said slots.

13. The method of claim 12 wherein said deflecting step comprises deflecting said tab section inwardly toward a longitudinal axis of the collated stack of sheet metal clips.

14. The method of claim 12 wherein said deflecting step comprises deflecting said tab section downwardly toward said leg portion of each said clip.

15. The method of claim 11 further comprising:
inserting an adhesive deposit into said slots after insertion of said ropes therein, said adhesive deposit retaining said ropes within said slots.

16. The method of claim 11 further comprising:
heating a thermally activated portion of said rope after said rope is inserted within said slots so as to retain said rope within said slots.

17. A method of manufacturing a collated stack of sheet metal clips comprising the steps of:
forming a planar sheet metal blank into a generally U-shaped clip having an arcuate crown portion and spaced parallel leg portions depending from said crown portion, said clip having opposed side edges, a slot extending inwardly from each said side edge;
aligning a plurality of said similarly oriented U-shaped clips such that each said clip is juxtapositioned to a leg portion of an adjacent said clip;
inserting a plastic rope within said slots on each said side edge of said clips; and
inserting an adhesive deposit into said slots after insertion of said ropes therein, said adhesive deposit retaining said ropes within said slots.

18. A method of manufacturing a collated stack of sheet metal clips comprising the steps of:
forming a planar sheet metal blank into a generally U-shaped clip having an arcuate crown portion and spaced parallel leg portions depending from said crown portion, said clip having opposed side edges, a slot extending inwardly from each said side edge;
aligning a plurality of said similarly oriented U-shaped clips such that each said clip is juxtapositioned to a leg portion of an adjacent said clip;
inserting a plastic rope within said slots on each said side edge of said clips; and
heating a thermally activated portion of said rope after said rope is inserted within said slots so as to retain said rope within said slots.

* * * * *